Figure 12:
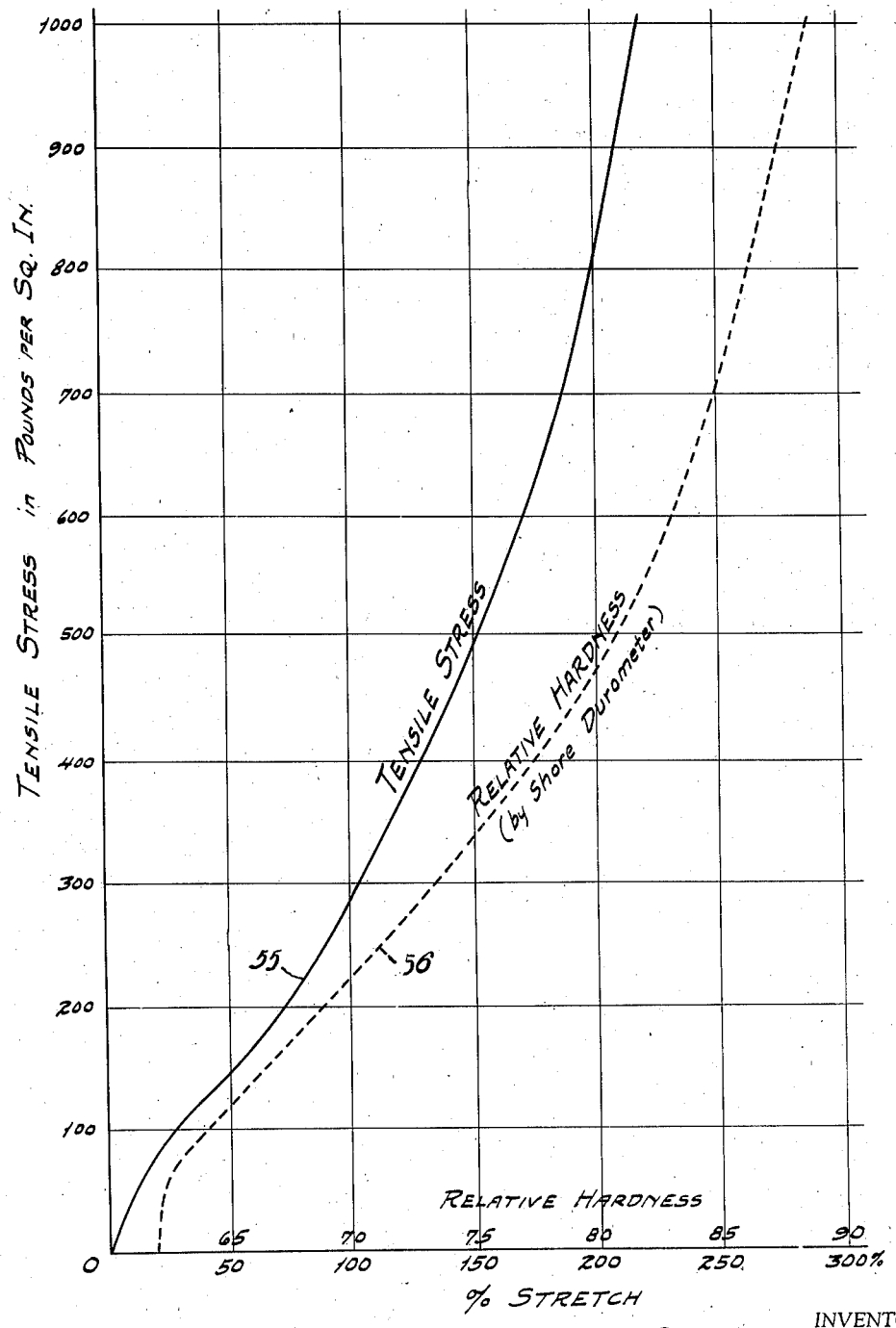

May 3, 1938. O. B. WELKER 2,116,254
RESILIENT BUSHING
Filed Dec. 5, 1936 3 Sheets-Sheet 1
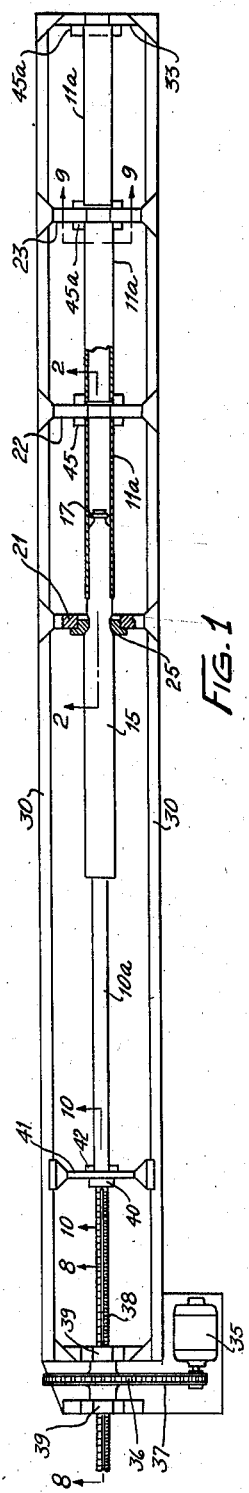
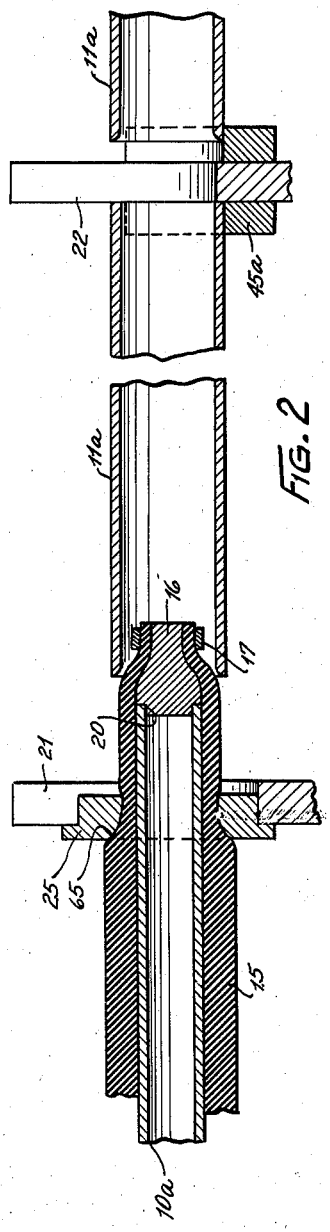
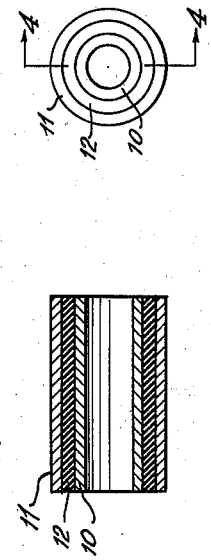
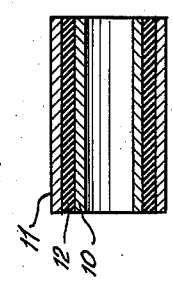
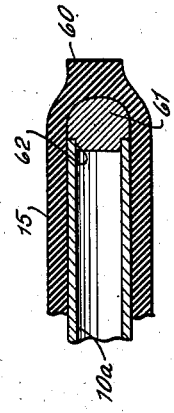
INVENTOR.
Oscar B. Welker
BY Bates, Golrick & Teare
ATTORNEYS.

May 3, 1938.  O. B. WELKER  2,116,254
RESILIENT BUSHING
Filed Dec. 5, 1936   3 Sheets-Sheet 2
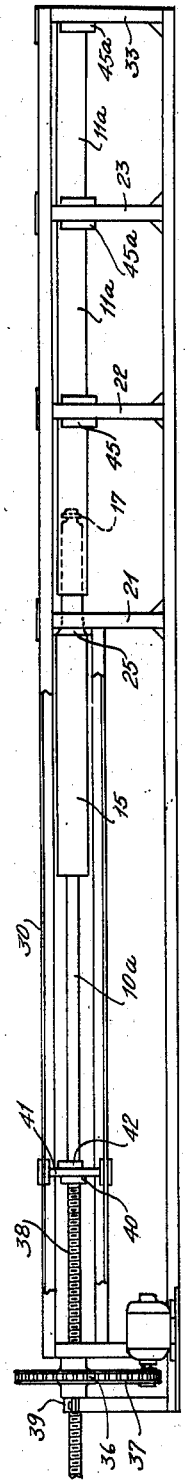
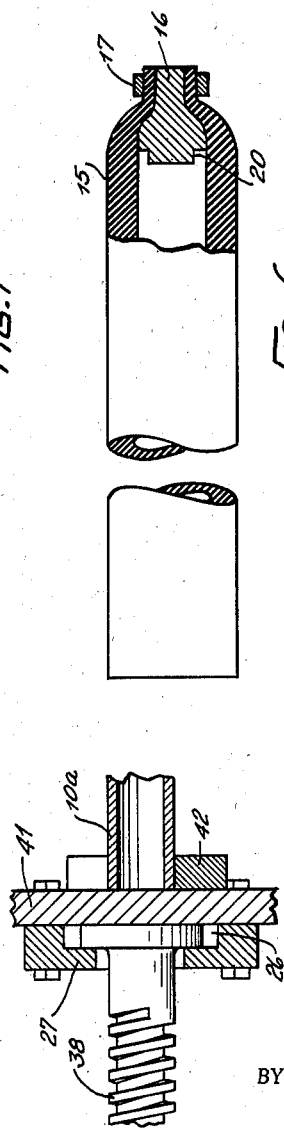
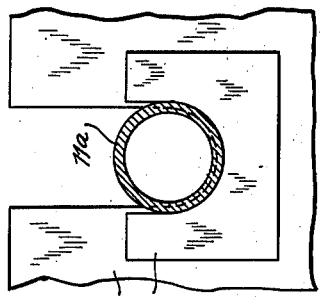
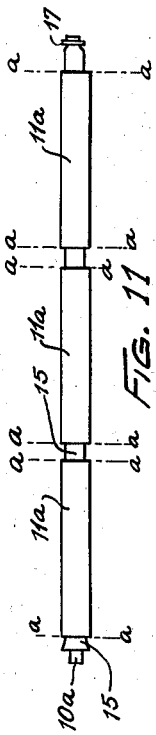
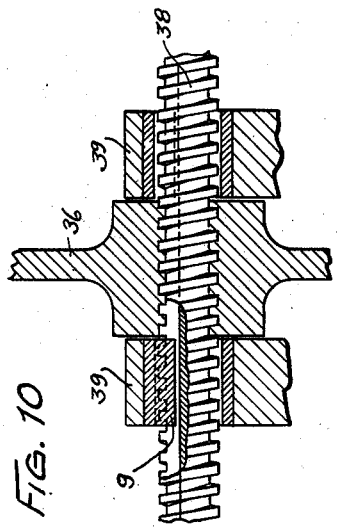
INVENTOR.
Oscar B. Welker
BY Bates, Goldrick & Teare
ATTORNEYS.

Patented May 3, 1938

2,116,254

UNITED STATES PATENT OFFICE 2,116,254

RESILIENT BUSHING

Oscar B. Welker, Middletown, Conn., assignor to Albert R. Teare, Cleveland, Ohio, as trustee Application December 5, 1936, Serial No. 114,449

2 Claims. (Cl. 287—85)

This invention relates to improvements in resilient connections, which embody inner and outer rigid members and an intermediate layer of rubber or other elastic material, and the invention includes an article having improved structural characteristics, which enhance the quality of the finished product, and which extend its availability for use. The present application is a continuation in part of my copending application, Serial No. 76,392 filed April 25, 1936.

Many forms of elastic connections, or bushings of the type referred to have been placed upon the market, but experience has shown that there are certain objections inherent in them. For example, in one form, the hollow rubber tube or sleeve has been assembled by first compressing it by inserting it into the outer tube and then further compressing it by the use of an expanded mandrel before the inner tube is inserted into place. The resulting connection is thereby limited in length and the stresses are distributed unequally from one end to the other.

Another form of bearing has been made by curing the rubber between concentric tubes. The shrinkage of the rubber during the cooling operation is then depended upon to place it under tension. As a result, the rubber is unable to withstand very much repeated torsional movement under load. Moreover, the rubber being under tension, deflects more than when under compression, thereby allowing the inner tube to move more readily out of center under dead load.

In making a connection of this type, it is important that the rubber be placed under a fairly high degree of stress, and that the stress be distributed uniformly through-out the rubber, for this uniform distribution results in greater frictional engagement with the inner and outer members and a longer life of the rubber. An effort to accomplish this result has included a method of manufacture in which the rubber sleeve has been slipped onto an inner tube for a portion of its length and then compressed by reducing the diameter of the outer tube. This method, however, did not permit a connection to be made in unlimited lengths. Moreover, it did not distribute the stresses uniformly throughout the length of the connection.

Still another effort to obtain the desired degree of compression has been to mount the rubber sleeves in tandem between the inner and outer tubes, and then to draw them together axially by the use of bolts. Under this method of manufacture, the rubber is not uniformly compressed for the greatest stress is at the ends where the compressive force is applied.

A further effort to overcome the difficulties enumerated has included the curing of a mass of rubber to the inner member and then forcing the assembly endwise into an outer member. Under such practice however, the rubber cannot flow on the bonded area and hence most of the flow takes place on the unbonded area, and hence the stresses are unequally distributed throughout the length of the connection. A further objection to the curing operation is the fact that it is too expensive and that the length of bushing produced is limited in length.

An object of my invention is to make a resilient connection in which the intermediate layer of elastic material is so stretched at the time of its assembly between the inner and outer members, that the stresses are uniformly distributed throughout the length of the material.

Referring now to the drawings, Fig. 1 is a top plan view of a machine for making the resilient connections in accordance with my invention; Fig. 2 is a vertical section taken on the line 2—2 in Fig. 1 and shown on a scale larger than that of Fig. 1; Fig. 3 is an end view of the torsional bushing; Fig. 4 is a section taken on the line 4—4 in Fig. 3; Fig. 5 is a section showing a modified form of construction of the stock from which the elastic sleeves are made; Fig. 6 is a side elevation partly in section of the rubber stock; Fig. 7 is a side elevation of the machine; Figs. 8, 9, and 10 are sections taken on the correspondingly numbered lines in Fig. 1; Fig. 11 is a side elevation of an assembled unit before the sections have been cut therefrom; and Fig. 12 is a diagram showing a stress-stretch curve of rubber that is usually used in making torsional connections.

In Figs. 3 and 4, the resilient connection which is made in accordance with my invention comprises an inner member 10, an outer member 11 and an intermediate member 12, all of which are shown as being cylindrical in shape, and as having a common axis. The inner and outer members are preferably made of metal, while the intermediate member is made of elastic material, such as rubber. It is understood that the inner member may be either tubular or a solid shaft of a cylindrical shape or even that of a polygon. The present application is concerned with the article that is made by the method hereinafter set forth in detail.

The preferred manner of carrying out my invention comprises the formation of rubber stock into a long tube, the body of which is indicated at 15. One end of the tube is closed and the opposite end is open. The closed end in one form of the invention may be formed by a plug 16, the outer end of which is reduced and is closely embraced by the stock. A ring 17 embraces the stock at the reduced neck and cooperates with the plug to impart strength of the stock at the closed end, so as to enable it to withstand the stresses that are incident to the stretching operation. The inner diameter of the stock is substantially equal to the outer diameter of the inner member 10, while the outer diameter of the stock is larger than the inner diameter of the member 11. Consequently it is necessary to reduce the wall thickness of the stock, and this I accomplish by stretching it during the assembly operation.

The method by which I insert the elastic sleeve between the inner and outer members comprises the insertion of a long continuous tube 10a into the stock until the forward end of it engages an annular shoulder 20 at the inner end of the plug 16. The assembled unit is then placed in a machine and moved in an axial direction through a forming die 25, which partially reduces the diameter of the rubber sleeve from whence it is passed into the tube 11a, which further reduces it to the finished size. The tube 11a when removed from the machine becomes the outer member 11 of the finished resilient connection.

The machine, which I have shown for stretching the rubber during the inserting operation, may comprise an open frame, which has sides 30, and ends 31 and 33 respectively. Between the ends there is a cross-member 21, which supports the die 25 and there are other cross members 22 and 23 each of which supports one end of a tube 11a. In the illustration shown, the end member 33 functions likewise as a support for one of the tubes 11a. While I have illustrated the machine as supporting three tubes 11a in tandem relationship, it is to be understood that the machine is capable of use with any number of tubes and that it may be designed for tubes of any length.

To force the stock into the outer member, I have shown an electric motor 35 which is adapted to rotate a gear 36 as by a belt drive 37. The gear 36 has the bore thereof threaded for engagement with a threaded spindle 38, which may be splined to a key 9 in one of the bearing caps 39. The spindle may have one end thereof connected to a carriage 41 that is mounted for movement along the members 30. The connection is illustrated in detail in Fig. 10 wherein the end of the spindle has a flange 40 that fits loosely into an opening 26 in a plate 27 that is fastened to the carriage. The carriage is provided with a saddle 42 in which the rearward end of the tube 10a is adapted to be supported, the saddle being U-shaped so that the tube together with the assembled stock thereon may be quickly inserted within the machine. It is to be understood that the axis of the threaded spindle is coextensive with that of the tube and with those of the tubes 11a. It is understood that other means of forcing the rubber through the die may be employed, such as pneumatic or hydraulic rams or pistons.

To use the apparatus, the tube 10—a is inserted into the rubber stock until it engages the closed end thereof whereupon the projecting end of the tube is placed within the saddle 42. At such time the neck of the stock is disposed between the carriage 41 and the die 25. The motor is then started whereupon the operator guides the forward end of the stock into the die. He then places one end of a tube 11a into a U-shaped saddle 45 on the cross member 22 and manually guides the other end to receive the moving unit that has passed through the die. The position of the parts at such time is represented in Fig. 2. As soon as the stock has entered such tube, the operator is then free to place another tube in the saddle 45—a on the cross member 23 and guide it in the same manner to receive the forwardly moving stock. The same operation is repeated until all of the tubes for which the machine has been designed have been assembled. It is understood that the length of the inner tube and of the rubber stock is such that at the completion of the operation, the reduced neck projects beyond the farmost end of the last outer tube. Thereupon, the unitary structure which comprises the tube 10a, the stretched rubber stock and the plurality of tubes 11—a is lifted from the machine and the motor is reversed to return the carriage to its initial position. The assembled unit which is shown in Fig. 11 is then cut into sections as along the lines a—a, each having a length of the outer tube 11a so that the finished product corresponds to that shown in Fig. 4. If desired, however, the outer tube may comprise an elongated member from which sections may be cut transversely. In such case the tube supports 22 and 23 would be eliminated and the tube would be supported on the end 33.

A modification of the rubber stock is shown in Fig. 5 wherein the forward end thereof is closed solely by the rubber wall which is reinforced by a thickened portion 60 to resist the stresses that are imparted to it during the stretching operation. To facilitate the uniform distribution of forces against the rubber, I insert a plug 61 which is rounded to conform to the shape of the inner end wall of the stock, and which has an annular shoulder 62 for receiving the tube 10a. I may also wish to force a rigid ring over the reduced end 60 to reinforce the rubber at this end in the stretching operation.

In making the stock either in the form shown in Figs. 2, 5, or 6, the rubber is cured on a mandrel, which is removed before the tube 10—a is inserted therein. In addition, the outer surfaces of the tube may be subjected to a grinding operation, so that its wall thickness may be uniform throughout its length. Moreover, to facilitate the entrance of the stock into the die and also into the outer tubes, I may apply lubricant in the form of vaseline to the outer surface before the stock engages the die; I may also lubricate the outer surface of the inner member and the inner surface of the outer member previous to the stretching operation. This lubricant greatly reduces the friction between the elastic material and the outside surface of the inner member and the inside surface of the outer member during the stretching operation, and thereby greatly assists in the uniform distribution of stresses throughout the length of the elastic material.

The reduction in size of the rubber stock through the die may comprise the only reduction employed, although if desired, the stock may be reduced farther upon entering the outer tube. To facilitate the reduction, the opening of the die is tapered, as shown at 65 and the wall of the tube 11a is tapered as at 66. Due to the fact that the forward end of the advancing unit is unsupported, except by the die, the rubber is free to flow and hence the stretching stresses are distributed uniformly. As a result, the finished resilient connection contains confined rubber, which is under a uniform state of stress to which it has been subjected during the forming operation, and hence the resilient connection is capable of withstanding a maximum number of oscillations without evidence of fatigue.

The chief advantage of the article, which is made in accordance with the present method lies in the fact that the rubber or other elastic material has been placed in tension throughout the length of the article, and that a predetermined percentage elongation of the stock or material is maintained very uniformly from one end to the other. The amount of stretch which may be obtained is limited only by the ultimate elongation of the elastic material, although it has been found that for ordinary torsional connections the amount of stretch need be only 100 to 150% when rubber having a Shore durometer hardness of 60 to 65 is used.

In Fig. 12, for example, there is shown a typical stress-stretch curve of the rubber that is usually used in torsional connections. The diagram in Fig. 12 shows the characteristics of the rubber when stresses up to 1000 lbs. per sq. in. are placed upon it, this being the range that would cover the use of most resilient connections. The ultimate strength of the rubber however, may be as high as 4000 lbs. per sq. in. The solid line curve designated 55 in Fig. 12 illustrates the stress-stretch characteristic, whereas the broken line curve designated 56 shows the stress-hardness characteristic of the rubber.

An inspection of the diagram in Fig. 12 shows that whenever the rubber is stretched an appreciable amount, the hardness, and therefore the internal pressure, in the structure of the rubber increases. For example, according to the diagram, whenever the rubber is stretched only 150% the relative hardness is increased from 60 to 75% or a relative increase of 21%. The internal pressure in the structure of the rubber, as is evidenced by the increase in hardness, exerts a much greater frictional force against the walls of the outer and inner rigid members of the resilient connection than would be possible if the rubber were not stretched. Moreover, the fact that the rubber is stretched uniformly throughout the length of the article insures a high frictional engagement with the inner and outer members of the resilient connection, and from one end to the other. In addition, the increase of internal pressure makes the rubber more resilient to torsional fatigue and more resistant to deformation and more capable of withstanding high unit bearing pressures, such as are encountered, for example, in spring shackles of automobiles.

A further advantage of an article that is made in accordance with the present method is the fact that the amount of stretch and likewise the stress which occurs in the rubber in the finished resilient connection can be predetermined. Conversely, the outside diameter of the free rubber tube can be predetermined whenever a definite amount of stretch is desired in the finished bushing. For example, if one desires $p$ percentage stretch in the rubber of the finished bushing, then the rubber must be stretched an amount equal to the product of $$\left(\frac{p}{100}+1\right)$$

and original length of the stock, and the cross sectional area of the free tube will be the product of $$\left(\frac{p}{100}+1\right)$$

and the cross-sectional area of the rubber in the finished bushing.

Assuming that: $r$ equals the radius of the inside surface of the rubber in the finished bushing.
$R$ equals the radius of the outside surface of the rubber in the finished bushing.
$R_1$ equals the outside radius of the free rubber tube before the stretching operation.

Then $\pi R^2 - \pi r^2 =$ the area of cross-section of rubber in the finished bushing.

The initial cross-sectional area =

$$(\pi R^2 - \pi r^2)\left(\frac{p}{100}+1\right)$$

or $$(\pi R_1^2 - \pi r^2) = (\pi R^2 - \pi r^2)\left(\frac{p}{100}+1\right)$$

and $$(R_1 - r) = \frac{(R^2 - r^2)\left(\frac{p}{100}+1\right)}{(R_1 + r)}$$

where $(R_1 - r)$ represents the wall thickness of the free rubber tube, that is to be stretched $p$ percentage in order to completely fill the space between the two metal members of the bushing.

Experience has shown that when vaseline has been applied to the outer surface of the inner member and to the inner surface of the outer member, as well as to the rubber tube that is to be stretched, the rubber can be stretched very uniformly by this method. Then after a few hours have elapsed the rubber absorbs the vaseline and the frictional resistance to twisting of one member with respect to the other is withstood entirely by the rubber. Experiments have further shown that the stress applied at the area of contact between the rubber and the inside member is practically equal to the stress in the body of the rubber; the action probably conforming to the law of fluid friction, whereby the stress applied to the fluid is exerted equally in all directions.

Accordingly, I have provided a practical method of predetermining the frictional engagement between the rubber and the inner and outer members of the torsional bushing, and by this method sufficient stress can be placed in the rubber by a predetermined calculation so as to withstand a specified twisting moment which the rubber is expected to encounter; and by using rubber with a good resistance to permanent set, the stress in the rubber can be maintained very near to that calculated over long periods of time.

An important advantage, therefore, of articles which are made in accordance with this method is that the stresses in the rubber and of the frictional engagement between the rubber and the retaining members can be accurately calculated in advance. A further advantage of the method is the fact that the resilient connection may be made in any length and then cut to the desired size, or if desired, a large number of short bushings may be made at one time. The method, therefore, possesses economical manufacturing advantages and assures uniform distribution of stresses in the stretched rubber.

An important advantage of the method disclosed herein is the fact that the resilient connection may be made in any length and then cut to the desired size, or if desired, a large number of short bushings may be made at one time. The method therefore possesses economical manufacturing advantages as well as assuring uniform distribution of stresses in the stretched rubber.

I claim:—

1. A resilient connection having rigid inner and outer members and an intermediate elastic member wherein the intermediate member is introduced into the outer member after it has been reduced by constriction to a substantially uniform outer diameter whereby the intermediate member is confined under tension upon being released between the walls of the rigid members with the stresses distributed uniformly and unidirectionally throughout the length of the intermediate layer.

2. A resilient connection having rigid inner and outer members and an intermediate elastic member wherein the intermediate member is introduced into the outer member after it has been reduced by constriction to a substantially uniform outer diameter, whereby the intermediate member is confined under tension upon being released between the walls of the rigid members with the stresses distributed uniformly and unidirectionally throughout the length of the intermediate layer, said outer member having at least one end thereof flared outwardly.

OSCAR B. WELKER.